US012713197B2

(12) United States Patent
Terentiv et al.

(10) Patent No.: US 12,713,197 B2
(45) Date of Patent: Aug. 18, 2026

(54) METHOD AND SYSTEM FOR CONTROLLING DIRECTIVITY OF AN AUDIO SOURCE IN A VIRTUAL REALITY ENVIRONMENT

(71) Applicant: DOLBY INTERNATIONAL AB, Dublin (IE)

(72) Inventors: Leon Terentiv, Erlangen (DE); Christof Joseph Fersch, Neumarkt (DE); Panji Setiawan, Munich (DE); Daniel Fischer, Fuerth (DE)

(73) Assignee: DOLBY INTERNATIONAL AB, Dublin (IE)

( * ) Notice: Subject to any disclaimer, the term of this patent is extended or adjusted under 35 U.S.C. 154(b) by 101 days.

(21) Appl. No.: 18/550,603

(22) PCT Filed: May 10, 2022

(86) PCT No.: PCT/EP2022/062543

§ 371 (c)(1),
(2) Date: Sep. 14, 2023

(87) PCT Pub. No.: WO2022/243094

PCT Pub. Date: Nov. 24, 2022

(65) Prior Publication Data

US 2024/0155304 A1 May 9, 2024

Related U.S. Application Data

(60) Provisional application No. 63/189,269, filed on May 17, 2021.

(30) Foreign Application Priority Data

May 17, 2021 (EP) .................................... 21174024

(51) Int. Cl.
*H04S 7/00* (2006.01)

(52) U.S. Cl.
CPC .......... *H04S 7/303* (2013.01); *H04S 2400/01* (2013.01); *H04S 2400/11* (2013.01); *H04S 2420/11* (2013.01)

(58) Field of Classification Search
None
See application file for complete search history.

(56) References Cited

U.S. PATENT DOCUMENTS 10,313,821 B2 6/2019 Pratt
10,425,762 B1 9/2019 Schissler
(Continued)

FOREIGN PATENT DOCUMENTS

EP 3729831 B1 * 4/2025 .............. G06F 3/011
JP H09160549 A 6/1997
(Continued)

*Primary Examiner* — Qin Zhu

(57) ABSTRACT

A method (700) for rendering an audio signal of an audio source (211, 212, 213) in a virtual reality rendering environment (180) is described. The method (700) comprises determining (701) whether or not a directivity pattern (232) of the audio source (211, 212, 213) is to be taken into account for a listening situation of a listener (181) within the virtual reality rendering environment (180). Furthermore, the method (700) comprises rendering (702) an audio signal of the audio source (211, 212, 213) without taking into account the directivity pattern (232) of the audio source (211, 212, 213), if it is determined that the directivity pattern (232) of the audio source (211, 212, 213) is not to be taken into account for the listening situation of the listener (181). On the other hand, the method (700) comprises rendering (703) the audio signal of the audio source (211, 212, 213) in dependence of the directivity pattern (232) of the audio source (211, 212, 213), if it is determined that the directivity (Continued)

Figure 1A:
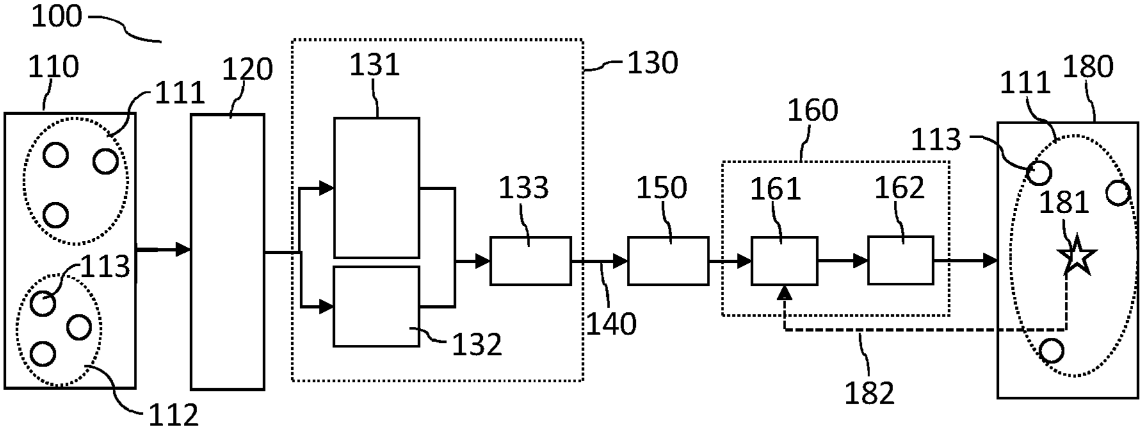

pattern (232) is to be taken into account for the listening situation of the listener (181).

16 Claims, 7 Drawing Sheets

(56) References Cited

U.S. PATENT DOCUMENTS

| | | | | |
|---|---|---|---|---|
| 2009/0214046 | A1 | 8/2009 | Suzuki | |
| 2009/0304211 | A1 | 12/2009 | Tashev | |
| 2013/0170649 | A1 | 7/2013 | Lee | |
| 2014/0376740 | A1 | 12/2014 | Shigenaga | |
| 2015/0023524 | A1 | 1/2015 | Shigenaga | |
| 2015/0281833 | A1 | 10/2015 | Shigenaga | |
| 2016/0043699 | A1 | 2/2016 | Sawa | |
| 2017/0019744 | A1 | 1/2017 | Matsumoto | |
| 2021/0006924 | A1* | 1/2021 | Terentiv | G06F 3/011 |
| 2021/0058730 | A1 | 2/2021 | Raghuvanshi et al. | |
| 2021/0092546 | A1* | 3/2021 | Terentiv | H04S 7/303 |
| 2021/0118452 | A1 | 4/2021 | Tsingos et al. | |
| 2023/0209302 | A1* | 6/2023 | Koppens | H04S 1/007 381/1 |
| 2024/0420676 | A1* | 12/2024 | Koppens | G10K 15/12 |

FOREIGN PATENT DOCUMENTS

| | | | | | |
|---|---|---|---|---|---|
| JP | 2021507558 | A | | 2/2021 | |
| RU | 2736418 | C1 | | 11/2020 | |
| WO | WO-2019121773 | A1 | * | 6/2019 | H04S 3/008 |
| WO | WO-2019121775 | A1 | * | 6/2019 | G06F 3/011 |
| WO | 20190130184 | A1 | | 7/2019 | |
| WO | 20190197349 | W | | 10/2019 | |
| WO | WO-2019204214 | A2 | * | 10/2019 | G10L 19/008 |

* cited by examiner

METHOD AND SYSTEM FOR CONTROLLING DIRECTIVITY OF AN AUDIO SOURCE IN A VIRTUAL REALITY ENVIRONMENT

CROSS-REFERENCE TO RELATED APPLICATIONS

This application is a U.S. National Stage application under U.S.C. 371 of International Application No. PCT/EP2022/062543, filed on May 10, 2022 (reference: D21027WO01), which claims priority of the following priority applications: U.S. provisional application 63/189,269 (reference: D21027USP1), filed 17 May 2021 and EP Application 21174024.6 (reference: D21027EP), filed 17 May 2021, which are hereby incorporated by reference.

TECHNICAL FIELD

The present document relates to an efficient and consistent handling of the directivity of audio sources in a virtual reality (VR) rendering environment.

BACKGROUND

Virtual reality (VR), augmented reality (AR) and/or mixed reality (MR) applications are rapidly evolving to include increasingly refined acoustical models of sound sources and scenes that can be enjoyed from different viewpoints and/or perspectives or listening positions. Two different classes of flexible audio representations may e.g. be employed for VR applications: sound-field representations and object-based representations. Sound-field representations are physically-based approaches that encode the incident wavefront at the listening position. For example, approaches such as B-format or Higher-Order Ambisonics (HOA) represent the spatial wavefront using a spherical harmonics decomposition. Object-based approaches represent a complex auditory scene as a collection of singular elements comprising an audio waveform or audio signal and associated parameters or metadata, possibly time-varying.

Enjoying the VR, AR and/or MR applications may include experiencing different auditory viewpoints or perspectives by the user. For example, room-based virtual reality may be provided based on a mechanism using 6 degrees of freedom (DoF). A 6 DoF interaction may comprise translational movement (forward/back, up/down and left/right) and rotational movement (pitch, yaw and roll). Unlike a 3 DoF spherical video experience that is limited to head rotations, content created for 6 DoF interaction also allows for navigation within a virtual environment (e.g., physically walking inside a room), in addition to the head rotations. This can be accomplished based on positional trackers (e.g., camera based) and orientational trackers (e.g. gyroscopes and/or accelerometers). 6 DoF tracking technology may be available on desktop VR systems (e.g., PlayStation®VR, Oculus Rift, HTC Vive) as well as on mobile VR platforms (e.g., Google Tango). A user's experience f directionality and spatial extent of sound or audio sources is critical to the realism of 6 DoF experiences, particularly an experience of navigation through a scene and around virtual audio sources.

Available audio rendering systems (such as the MPEG-H 3D audio renderer) are typically limited to the rendering of 3 DoFs (i.e. rotational movement of an audio scene caused by a head movement of a listener) or 3 DoF+, which also adds small translational changes of the listening position of a listener, but without taking effects such as directivity or occlusion into consideration. Larger translational changes of the listening position of a listener and the associated DoFs can typically not be handled by such renderers.

The present document is directed at the technical problem of providing resource efficient methods and systems for handling translational movement in the context of audio rendering. In particular, the present document addresses the technical problem of handling the directivity of audio sources within 6DoF audio rendering in a resource efficient and consistent manner.

SUMMARY

According to an aspect, a method for rendering an audio signal of an audio source in a virtual reality rendering environment is described. The method comprises determining whether or not the directivity pattern of the audio source is to be taken into account for the (current) listening situation of a listener within the virtual reality rendering environment. Furthermore, the method comprises rendering an audio signal of the audio source without taking into account the directivity pattern of the audio source, if it is determined that the directivity pattern of the audio source is not to be taken into account for the listening situation of the listener. In addition, the method comprises rendering the audio signal of the audio source in dependence of the directivity pattern of the audio source, if it is determined that the directivity pattern is to be taken into account for the listening situation of the listener.

According to a further aspect, a method for rendering an audio signal of a first audio source to a listener within a virtual reality rendering environment is described. It should be noted that the term virtual reality rendering environment should also include augmented and/or mixed reality rendering environments. The method comprises determining a control value for the listening situation of the listener within the virtual reality rendering environment based on a directivity control function. Furthermore, the method comprises adjusting the directivity pattern, notably a directivity gain of the directivity pattern, of the first audio source in dependence of the control value. In addition, the method comprises rendering the audio signal of the first audio source in dependence of the adjusted directivity pattern, notably in dependence of the adjusted directivity gain, of the first audio source to the listener within the virtual reality rendering environment.

According to a further aspect, a virtual reality audio renderer for rendering an audio signal of an audio source in a virtual reality rendering environment is described. The audio renderer is configured to determine whether or not the directivity pattern of the audio source is to be taken into account for the listening situation of a listener within the virtual reality rendering environment. In addition, the audio renderer is configured to render an audio signal of the audio source without taking into account the directivity pattern of the audio source, if it is determined that the directivity pattern of the audio source is not to be taken into account for the listening situation of the listener. The audio renderer is further configured to render the audio signal of the audio source in dependence of the directivity pattern of the audio source, if it is determined that the directivity pattern is to be taken into account for the listening situation of the listener.

According to another aspect, a virtual reality audio renderer for rendering an audio signal of a first audio source to a listener within a virtual reality rendering environment is described. The audio renderer is configured to determine a control value for a listening situation of the listener within the virtual reality rendering environment based on a directivity control function (provided e.g., within a bitstream). Furthermore, the audio renderer is configured to adjust the directivity pattern (provided e.g., within the bitstream) of the first audio source in dependence of the control value. The audio renderer is further configured to render the audio signal of the first audio source in dependence of the adjusted directivity pattern of the first audio source to the listener within the virtual reality rendering environment.

According to a further aspect, a method for generating a bitstream is described. The method comprises determining an audio signal of at least one audio source, and determining a source position of the at least one audio source within a virtual reality rendering environment. In addition, the method comprises determining a (non-uniform) directivity pattern of the at least one audio source, and determining a directivity control function for controlling use of the directivity pattern for rendering the audio signal of the at least one audio source in dependence of the listening situation of a listener within the virtual reality rendering environment. The method further comprises inserting data regarding the audio signal, the source position, the directivity pattern and the directivity control function into the bitstream.

According to a further aspect, an audio encoder configured to generate a bitstream is described. The bitstream may be indicative of an audio signal of at least one audio source and/or of a source position of the at least one audio source within a virtual reality rendering environment. Furthermore, the bitstream may be indicative of a directivity pattern of the at least one audio source, and/or of a directivity control function for controlling use of the directivity pattern for rendering the audio signal of the at least one audio source in dependence of a listening situation of a listener within the virtual reality rendering environment.

According to another aspect, a bitstream and/or a syntax for a bitstream is described. The bitstream may be indicative of an audio signal of at least one audio source and/or of a source position of the at least one audio source within a virtual reality rendering environment. Furthermore, the bitstream may be indicative of a directivity pattern of the at least one audio source, and/or of a directivity control function for controlling use of the directivity pattern for rendering the audio signal of the at least one audio source in dependence of a listening situation of a listener within the virtual reality rendering environment. The bitstream may comprise one or more data elements which comprise data regarding the above mentioned information.

According to a further aspect, a software program is described. The software program may be adapted for execution on a processor and for performing the method steps outlined in the present document when carried out on the processor.

According to another aspect, a computer-readable storage medium is described. The computer-readable storage medium may comprise (instructions of) a software program adapted for execution on a processor (or a computer) and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

SHORT DESCRIPTION OF THE FIGURES

Figure 1B:
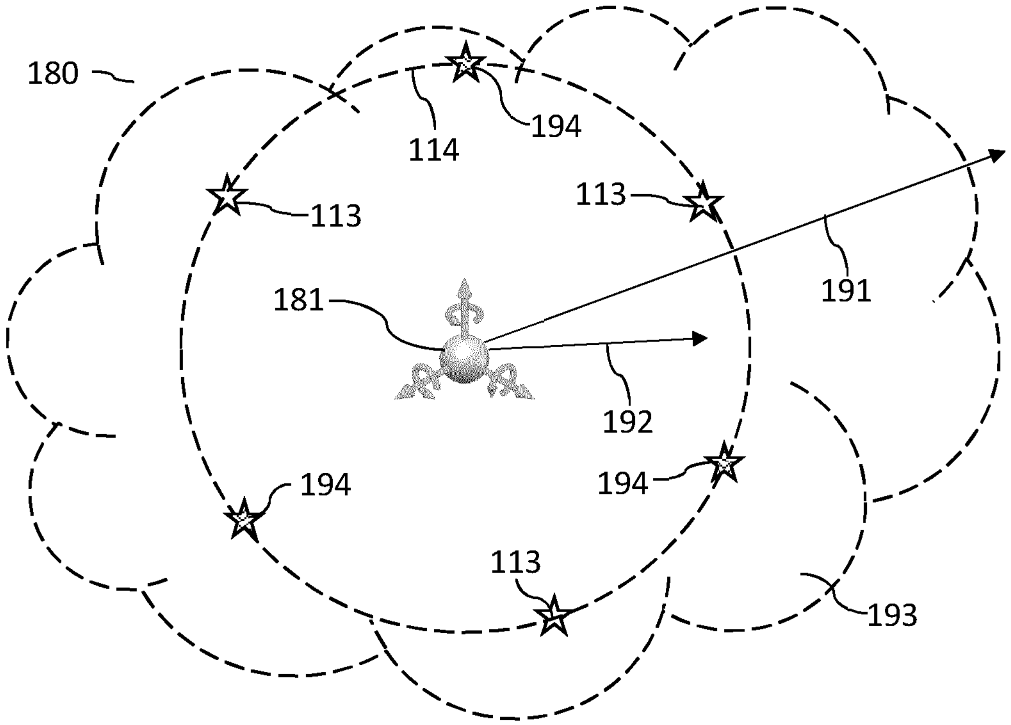
Figure 2:
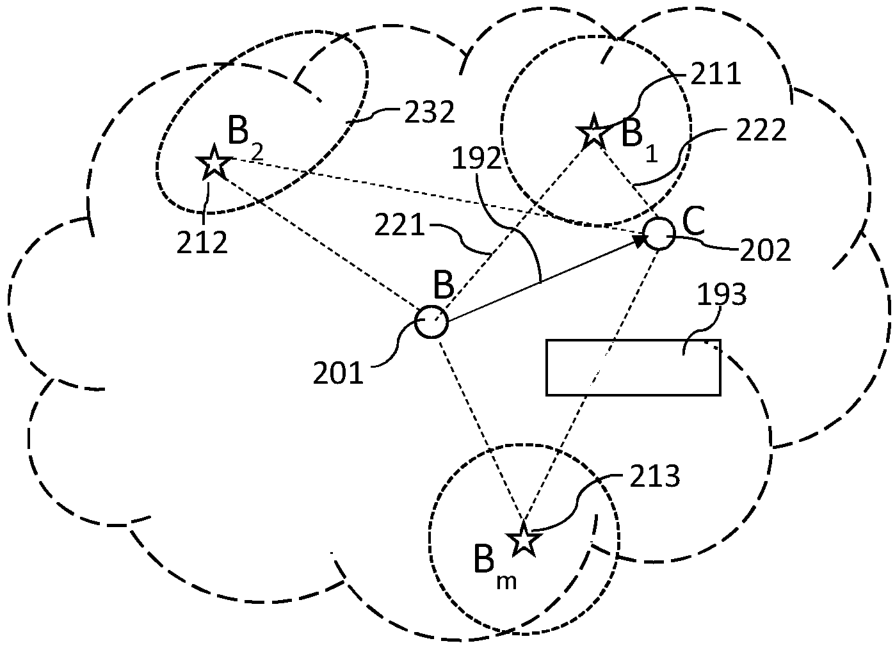
Figure 3A:
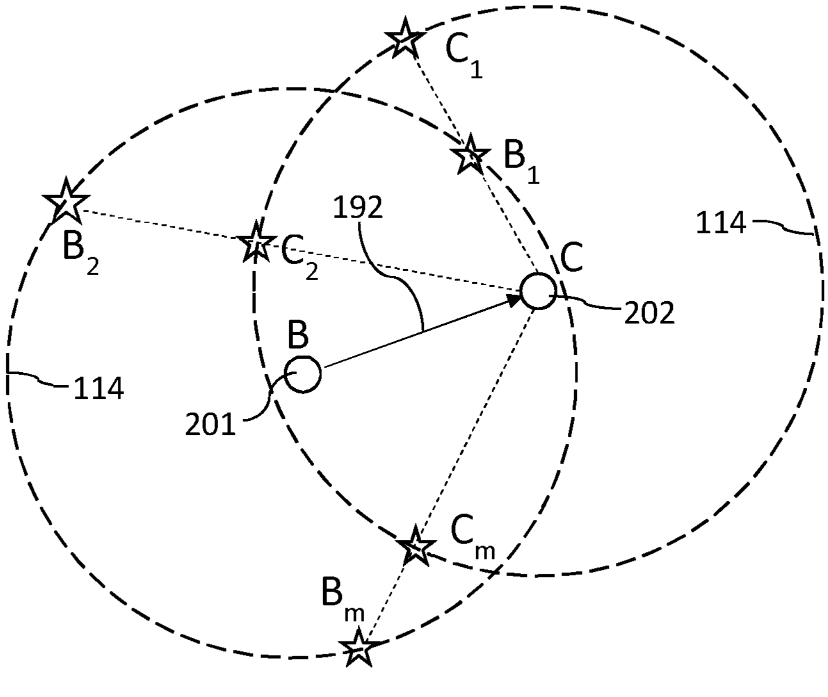
Figure 3B:
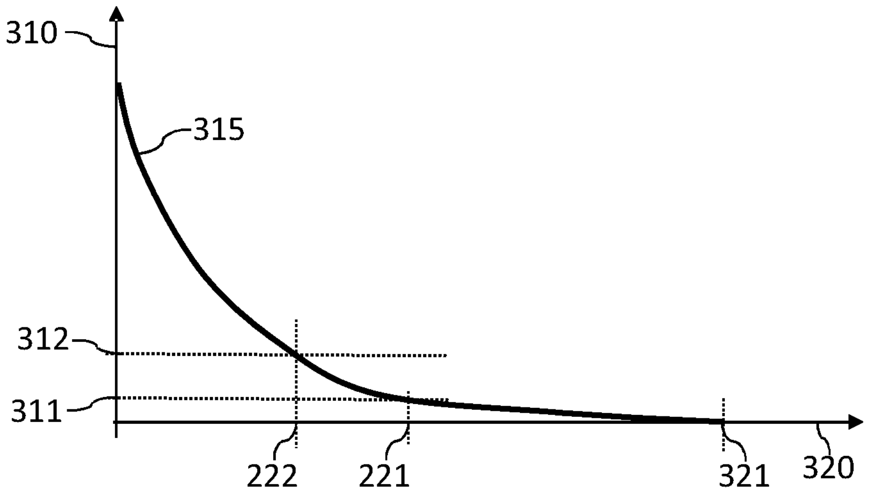
Figure 4A:
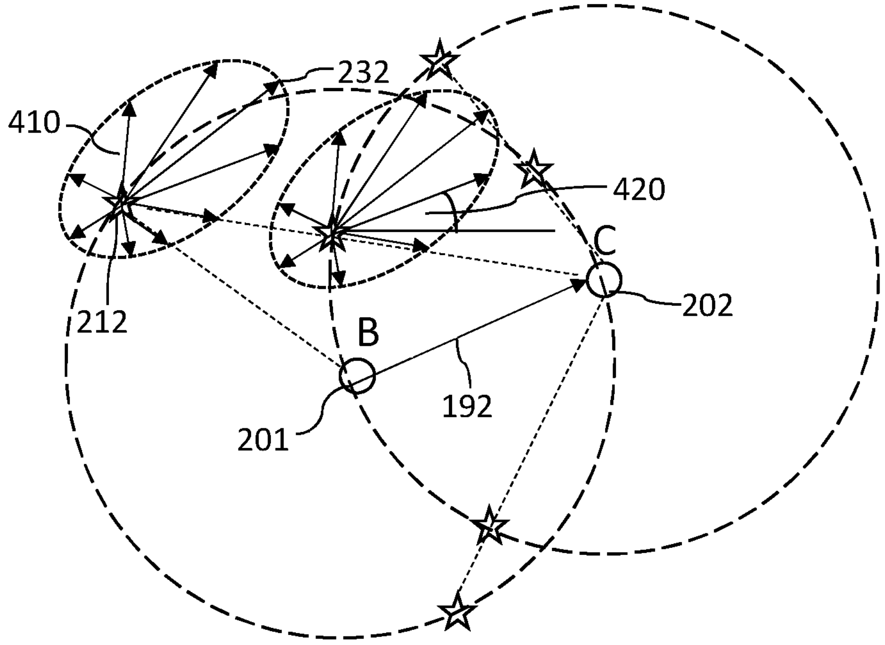
Figure 4B:
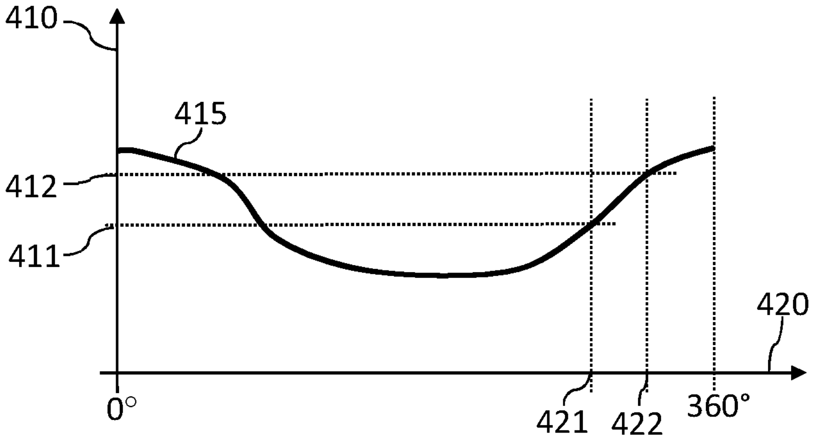
Figure 5A:
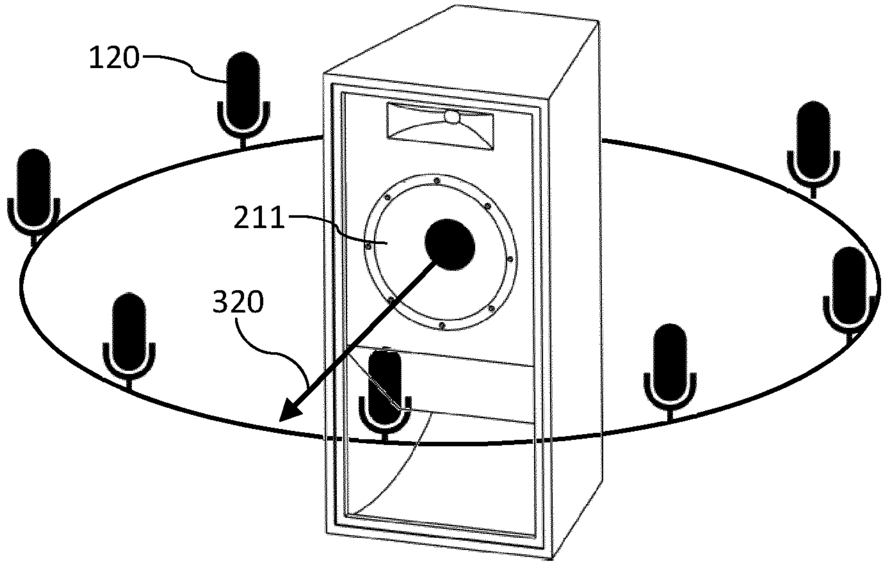
Figure 5B:
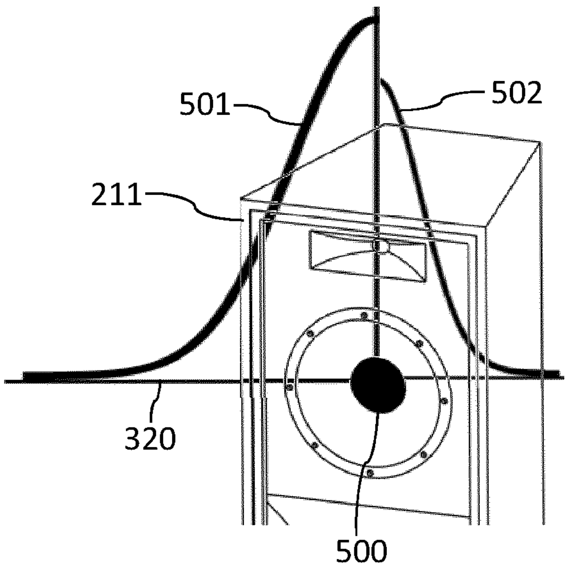
Figure 6A:
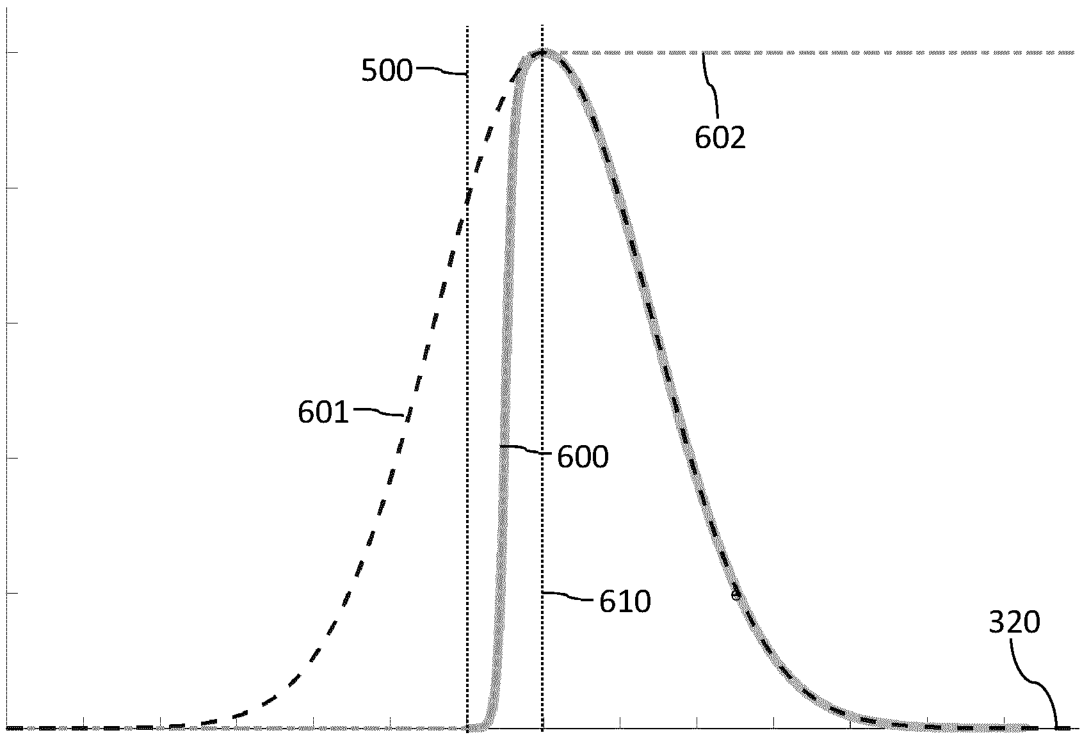
Figure 6B:
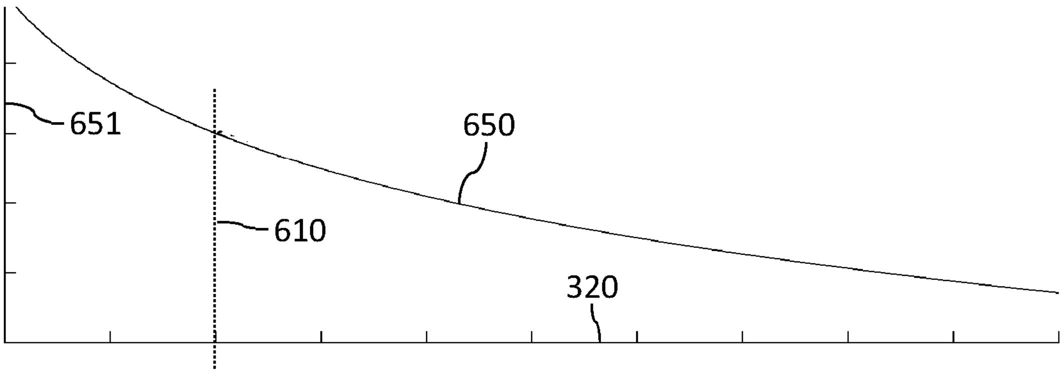
Figure 7A:
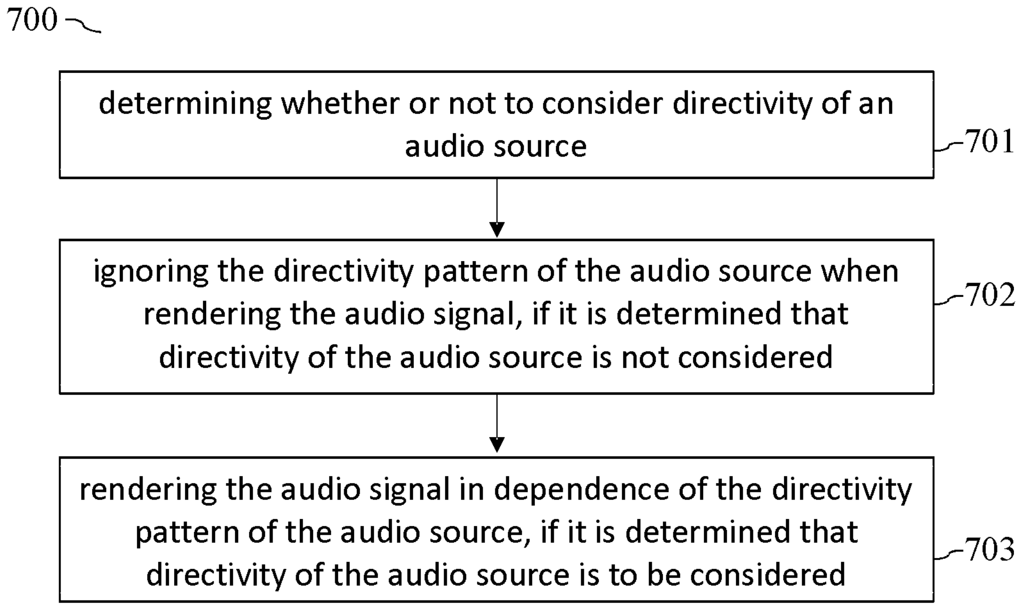
Figure 7B:
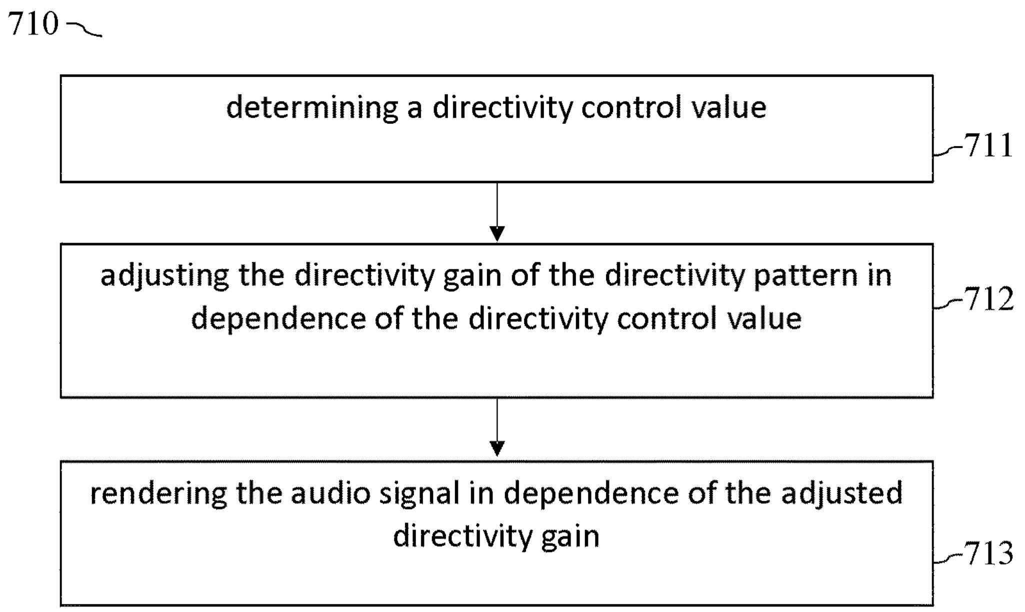
Figure 7C:
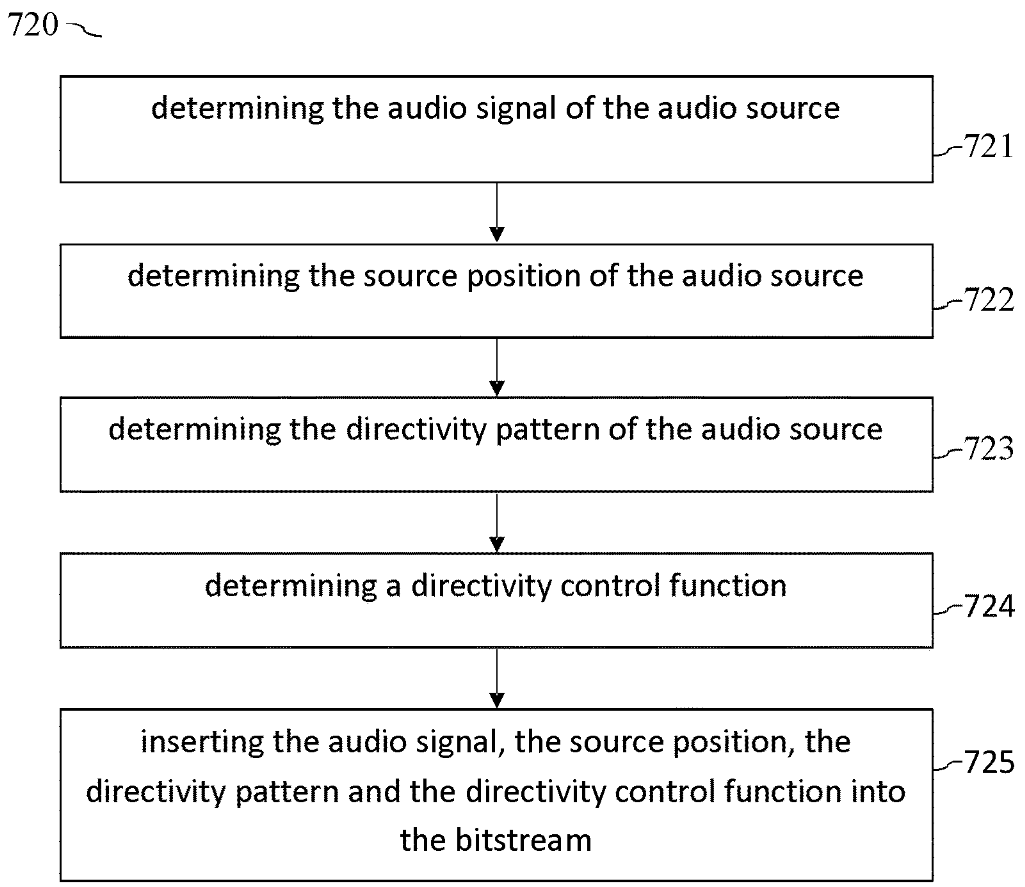

The invention is explained below in an exemplary manner with reference to the accompanying drawings, wherein FIG. 1*a* shows an example audio processing system for providing 6 DoF audio;

FIG. 1*b* shows example situations within a 6 DoF audio and/or rendering environment;

FIG. 2 shows an example audio scene;

FIG. 3*a* illustrates the remapping of audio sources in reaction of a change of the listening position within an audio scene;

FIG. 3*b* shows an example distance function;

FIG. 4*a* illustrates an audio source with a non-uniform directivity pattern;

FIG. 4*b* shows an example directivity function of an audio source;

FIG. 5*a* shows an example setup for measuring a directivity pattern;

FIG. 5*b* illustrates example directivity gains when passing through a virtual audio source;

FIG. 6*a* shows an example directivity control function;

FIG. 6*b* shows an example attenuation function;

FIGS. 7*a* and 7*b* show flow charts of example methods for rending a 3D audio signal of an audio source within an audio scene; and FIG. 7*c* shows a flow chart of an example method for generating a bitstream for a virtual reality audio scene.

DETAILED DESCRIPTION

As outlined above, the present document relates to the efficient and consistent provision of 6DoF in a 3D (three dimensional) audio environment. FIG. 1*a* illustrates a block diagram of an example audio processing system 100. An acoustic environment 110 such as a stadium may comprise various different audio sources 113. Example audio sources 113 within a stadium are individual spectators, a stadium speaker, the players on the field, etc. The acoustic environment 110 may be subdivided into different audio scenes 111, 112. By way of example, a first audio scene 111 may correspond to the home team supporting block and a second audio scene 112 may correspond to the guest team supporting block. Depending on where a listener is positioned within the audio environment, the listener will either perceive audio sources 113 from the first audio scene 111 or audio sources 113 from the second audio scene 112.

The different audio sources 113 of an audio environment 110 may be captured using audio sensors 120, notably using microphone arrays. The one or more audio scenes 111, 112 of an audio environment 110 may be described using multichannel audio signals, one or more audio objects and/or higher order ambisonic (HOA) and/or first order ambisonic (FOA) signals. In the following, it is assumed that an audio source 113 is associated with audio data that is captured by one or more audio sensors 120, wherein the audio data indicates an audio signal (which is emitted by the audio source 113) and the position of the audio source 113, as a function of time (at a particular sampling rate of e.g. 20 ms).

A 3D audio renderer, such as the MPEG-H 3D audio renderer, typically assumes that a listener 181 is positioned at a particular (fixed) listening position 182 within an audio scene 111, 112. The audio data for the different audio sources 113 of an audio scene 111, 112 is typically provided under the assumption that the listener 181 is positioned at this particular listening position 182. An audio encoder 130 may comprise a 3D audio encoder 131 which is configured to encode the audio data of the one or more audio sources 113 of the one or more audio scenes 111, 112 of an audio environment 110.

Furthermore, VR (virtual reality) metadata may be provided, which enables a listener 181 to change the listening position 182 within an audio scene 111, 112 and/or to move between different audio scenes 111, 112. The encoder 130 may comprise a metadata encoder 132 which is configured to encode the VR metadata. The encoded VR metadata and the encoded audio data of the audio sources 113 may be combined in combination unit 133 to provide a bitstream 140 which is indicative of the audio data and the VR metadata. The VR metadata may e.g. comprise environmental data describing the acoustic properties of an audio environment 110.

The bitstream 140 may be decoded using a decoder 150 to provide the (decoded) audio data and the (decoded) VR metadata. An audio renderer 160 for rendering audio within a rendering environment 180 which allows 6DoFs may comprise a pre-processing unit 161 and a (conventional) 3D audio renderer 162 (such as a MPEG-H 3D audio renderer). The pre-processing unit 161 may be configured to determine the listening position 182 of a listener 181 within the listening environment 180. The listening position 182 may indicate the audio scene 111 within which the listener 181 is positioned. Furthermore, the listening position 182 may indicate the exact position within an audio scene 111. The pre-processing unit 161 may further be configured to determine a 3D audio signal for the current listening position 182 based on the (decoded) audio data and possibly based on the (decoded) VR metadata. The 3D audio signal may then be rendered using the 3D audio renderer 162. The 3D audio signal may comprise the audio signals of one or more audio sources 113 of the audio scene 111.

It should be noted that the concepts and schemes, which are described in the present document, may be specified in a frequency-variant manner, may be defined either globally or in an object/media-dependent manner, may be applied directly in a spectral or a time domain and/or may be hardcoded into the VR renderer 160 or may be specified via a corresponding input interface. FIG. 1*b* shows an example rendering environment 180. The listener 181 may be positioned within an origin audio scene 111. For rendering purposes, it may be assumed that the audio sources 113, 194 are placed at different rendering positions on a (unity) sphere 114 around the listener 181, notably around the listening position 182. The rendering positions of the different audio sources 113, 194 may change over time (according to a given sampling rate). The positions of the different audio sources 113, 194 may be indicated within the VR metadata. Different situations may occur within a VR rendering environment 180: The listener 181 may perform a global transition 191 from the origin audio scene 111 to a destination audio scene 112. Alternatively, or in addition, the listener 181 may perform a local transition 192 to a different listening position 182 within the same audio scene 111. Alternatively, or in addition, an audio scene 111 may exhibit environmental, acoustically relevant, properties (such as a wall), which may be described using environmental data 193 and which should be taken into account, when a change of the listening position 182 occurs. The environmental data 193 may be provided as VR metadata. Alternatively, or in addition, an audio scene 111 may comprise one or more ambience audio sources 194 (e.g. for background noise) which should be taken into account, when a change of the listening position 182 occurs.

FIG. 2 shows an example local transition 192 from an origin listening position B 201 to a destination listening position C 202 within the same audio scene 111. The audio scene 111 comprises different audio sources or objects 211, 212, 213. The different audio sources or objects 211, 212, 213 may have different directivity profiles 232 (also referred to herein as directivity patterns). The directivity profiles 232 of the one or more audio sources 211, 212, 213 may be indicates as VR metadata. Furthermore, the audio scene 111 may have environmental properties, notably one or more obstacles, which have an influence on the propagation of audio within the audio scene 111. The environmental properties may be described using environmental data 193. In addition, the relative distances 221, 222 of an audio object 211 to the different listening positions 182, 201, 202 may be known (e.g. based on the data of one or more sensors (such as a gyroscope or an accelerometer) of a VR renderer 160).

FIGS. 3*a* and 3*b* illustrate a scheme for handling the effects of a local transition 192 on the intensity of the different audio sources or objects 211, 212, 213. As outlined above, the audio sources 211, 212, 213 of an audio scene 111 are typically assumed by a 3D audio renderer 162 to be positioned on a sphere 114 around the listening position 201. As such, at the beginning of a local transition 192, the audio sources 211, 212, 213 may be placed on an origin sphere 114 around the origin listening position 201 and at the end of the local transition 192, the audio sources 211, 212, 213 may be placed on a destination sphere 114 around the destination listening position 202. An audio source 211, 212, 213 may be remapped from the origin sphere 114 to the destination sphere 114. For this purpose, a ray that goes from the destination listening position 202 to the source position of the audio source 211, 212, 213 on the origin sphere 114 may be considered. The audio source 211, 212, 213 may be placed on the intersection of the ray with the destination sphere 114.

The intensity F of an audio source 211, 212, 213 on the destination sphere 114 typically differs from the intensity on the origin sphere 114. The intensity F may be modified using an intensity gain function or distance function 315 (also referred to herein as an attenuation function), which provides a distance gain 310 (also referred to herein as an attenuation gain) as a function of the distance 320 of an audio source 211, 212, 213 from the listening position 182, 201, 202. The distance function 315 typically exhibits a cut-off distance 321 above which a distance gain 310 of zero is applied. The origin distance 221 of an audio source 211 to the origin listening position 201 provides an origin gain 311. Furthermore, the destination distance 222 of the audio source 211 to the destination listening position 202 provides a destination gain 312. The intensity F of the audio source 211 may be rescaled using the origin gain 311 and the destination gain 312, thereby providing the intensity F of the audio source 211 on the destination sphere 114. In particular, the intensity F of the origin audio signal of the audio source 211 on the origin sphere 114 may be divided by the origin gain 311 and multiplied by the destination gain 322 to provide the intensity F of the destination audio signal of the audio source 211 on the destination sphere 114.

Hence, the position of an audio source 211 subsequent to a local transition 192 may be determined as: $C_i$=source_remap_function($B_i$, C) (e.g. using a geometric transformation). Furthermore, the intensity of an audio source 211 subsequent to a local transition 192 may be determined as: $F(C_i)=F(B_i)$*distance_function($B_i$, $C_i$, C). The distance attenuation may therefore be modelled by the corresponding distance gains 315 provided by the distance function 315.

FIGS. 4*a* and 4*b* illustrate an audio source 212 having a non-uniform directivity profile 232. The directivity profile may be defined using directivity gains 410 which indicate a gain value for different directions or directivity angles 420. In particular, the directivity profile 232 of an audio source 212 may be defined using a directivity gain function 415 which indicates the directivity gain 410 as a function of the directivity angle 420 (wherein the angle 420 may range from 0° to 360°). It should be noted that for 3D audio sources 212, the directivity angle 420 is typically a two-dimensional angle comprising an azimuth angle and an elevation angle. Hence, the directivity gain function 415 is typically a two-dimensional function of the two-dimensional directivity angle 420.

The directivity profile 232 of an audio source 212 may be taken into account in the context of a local transition 192 by determining the origin directivity angle 421 of the origin ray between the audio source 212 and the origin listening position 201 (with the audio source 212 being placed on the origin sphere 114 around the origin listening position 201) and the destination directivity angle 422 of the destination ray between the audio source 212 and the destination listening position 202 (with the audio source 212 being placed on the destination sphere 114 around the destination listening position 202). Using the directivity gain function 415 of the audio source 212, the origin directivity gain 411 and the destination directivity gain 412 may be determined as the function values of the directivity gain function 415 for the origin directivity angle 421 and the destination directivity angle 422, respectively (see FIG. 4*b*). The intensity F of the audio source 212 at the origin listening position 201 may then by divided by the origin directivity gain 411 and multiplied by the destination directivity gain 412 to determine the intensity F of the audio source 212 at the destination listening position 202.

Hence, sound source directivity may be parametrized by a directivity factor or gain 410 indicated by a directivity gain function 415. The directivity gain function 415 may indicate the intensity of the audio source 212 at a defined distance as a function of the angle 420 relative to the listening position 182, 201, 202. The directivity gains 410 may be defined as ratios with respect to the gains of an audio source 212 at the same distance, having the same total power that is radiated uniformly in all directions. The directivity profile 232 may be parametrized by a set of gains 410 that correspond to vectors which originate at the center of the audio source 212 and which end at points distributed on a unit sphere around the center of the audio source 212.

The resulting audio intensity of an audio source 212 at a destination listening position 202 may be estimated as: $F(C_i)=F(B_i)$*Distance_function( )*Directivity_gain_function($C_i$, C, Directivity_paramertization), wherein the Directivity_gain_function is dependent of the directivity profile 232 of the audio source 212. The Distance_function( ) takes into account the modified intensity caused by the change in distance 321, 322 of the audio source 212 due to the transition of the listening position 201, 202.

FIG. 5*a* shows an example setup for measuring the directivity profile 232 of an audio source 211 at a given distance 320. For this purpose, audio sensors 120, notably microphones, may be placed on a circle around the audio source 211, wherein the circle has a radius corresponding to the given distance 320. The intensity or magnitude of the audio signal may be measured for different angles 420 on the circle, thereby providing a directivity pattern P (D) 232 for the distance D 320. Such a directivity pattern or profile may be determined for a plurality of different distance values D 320.

The directivity pattern data may represent:

- the sound emission characteristics caused by an audio source or object 211 generating a sound field;
- effects of local sound occlusion caused by close obstacles, influencing a sound field; and/or
- the content creator's intent.

The directivity pattern data is typically measured (and only valid) for a specific distance range from the audio source 211, as illustrated in FIG. 5*a*.

If directivity gains from a directivity pattern 232 are directly applied to the rendered audio signal, one or more issues may occur. The consideration of directivity may often not be perceptually relevant for a listening position 182, 201, 202 which is relatively far away from the audio object 211. Reasons for this may be

- a relatively low total object sound energy (e.g. due to a dominating distance attenuation effect);
- a psychoacoustical masking effect (caused by one or more other audio sources 212, 213 which are closer to the listening position 201, caused by reverberance and/or caused by early reflections);
- a relatively low subjective importance of the audio object 211 for the listener's attention; and/or
- the absence of a clear visual indication showing an orientation of the object 211, which corresponds to the directivity of the audio object 211.

A further issue may be that the application of directivity results in a sound intensity discontinuity at the origin 500 (i.e. at the source position) of the audio source 211, as illustrated in FIG. 5*b*. This acoustic artifact may be perceived when the listener passes through the origin 500 of the audio source 211 within the virtual audio scene 111 (notably for an audio source 211 which is represented by a volumetric object). A user may perceive an abrupt sound level change at the center point 500 of the audio source 211, while going through such virtual object. This is illustrated in FIG. 5*b* which shows the sound level 501, when approaching the center point 500 of the audio source 211 from the front, and the sound level 502, when leaving the center point 500 at the rear side of the audio source 211. It can be seen in FIG. 5*b* that at the center point 500 a discontinuity in sound level 501, 502 occurs.

For a given audio source 211 a set of N acoustic source directivity patterns $P_i=P(D_i)$, with $i \in \{1, \ldots, N\}$, may be available for the different distances $D_i$ from the center 500 of the sound emitting object 211 (with N=1 or more, or 2 or more, or 3 or more). For all distances D in between these directivity patterns $\min(D_i) \leq D \leq \max(D_i)$ a spatial interpolation scheme may be applied to determine that directivity pattern for the particular distance D. By way of example, linear interpolation may be used.

In the present document a scheme is described for determining extrapolated (and possibly optimized) directivity gain values P=P(D) for relatively small distances ($D<\min(D_i)$) from the origin 500 of the audio source 211 (i.e. for distances 320 between the audio source center 500 and the smallest distance for which a directivity pattern is available).

Furthermore, a scheme is described for determining extrapolated (and possibly optimized) directivity gain values P=P(D) for relatively large distances (D>max($D_i$)) (i.e. beyond the largest distance for which a directivity pattern exists).

The scheme described herein is configured to prevent a sound level discontinuity at the origin 500, i.e. for D=0, and/or to avoid directivity gain calculations resulting in perceptually irrelevant changes of a sound field for relatively large distances, i.e. D→∞. It may be assumed that the effect of applying directivity is neglectable for D→0 and/or for D>D*, where D* is a defined distance threshold.

A directivity control value (directivity_control_gain) may be calculated for a particular listening situation. The directivity control value may be indicative of the relevance of the corresponding directivity data for the particular listening situation of the listener 181. The directivity control value may be determined based on the value of the user-to-object distance D (distance) 320 and based on a given reference distance $D_i$ (reference distance) for the directivity (which may e.g. be min($D_i$) or max($D_i$). The reference distance $D_i$ may be a distance $D_i$ for which a directivity pattern 232 is available. The directivity control value (also referred to herein as the directivity_control_gain) may be determined using a directivity control function (as shown in FIG. 6*a*), i.e.

directivity_control_gain=get_directivity_control_gain (distance, reference_distance).

The value of the directivity control value (directivity_control_gain) may be compared to the predefined directivity control value threshold D*(directivity_control_threshold). If the directivity control value is bigger than the threshold D*, then a (distance independent) directivity gain value (directivity_gain_tmp) may be determined based on the directivity pattern 232, and the directivity gain value may be modified according to the directivity control value (directivity_control_gain). The modification of the directivity gain value may be done as indicated by the following pseudocode:

```
if directivity_control_gain>directivity_control_threshold
directivity_gain_tmp=get_directivity_gain( )
directivity_gain=directivity_control_gain*
  (directivity_gain_tmp−1)+1;
else
directivity_gain=1;
end
```

As indicated in the above-mentioned pseudocode, the directivity data application may be omitted if the directivity control value is smaller than the threshold D*.

The resulting (distance dependent) directivity gain (directivity_gain) may be applied to the corresponding distance attenuation gain as follows:

```
distance_attenuation_gain=get_attenuation_gain( )
gain=directivity_gain*distance_attenuation_gain;
```

FIG. 6*a* shows an example directivity control function 600 get_directivity_control_gain( ) The point of highest importance (i.e. of subjective relevance) of the directivity effect is located in the area around the marked position or reference distance 610 (reference_distance). The reference distance 610 may be a distance 320 for which a directivity pattern 232 has been measured. The directivity effect starts from a value smaller than the reference distance 610 and vanishes for relatively large distances above the reference distance 610. Calculations regarding the application of directivity are performed only for distances 320 for which the directivity control value is higher than the threshold value D*. Hence, directivity is not applied near the origin 500 and/or far away from the origin 500.

FIG. 6*a* illustrates how the directivity control function 600 may be determined based on a combination of a ("s"-shaped) function 602 which monotonically decreases to 0 for relatively small distances and stays close to 1 for the reference distance 610 and higher (to address the discontinuity issue at the origin 500). Another function 601 may be monotonically decreasing to 0 for relatively large distances 320 and may have its maximum at the reference distance 610 (to address the issue of perceptual relevance). The function 600 representing the product of both functions 601, 602 takes into account both issues simultaneously, and may be used as directivity control function.

FIG. 6*b* shows an example distance attenuation function 650 get_attenuation_gain( ), which indicates a distance gain 651 as a function of the distance 320 and which represents the attenuation of the audio signal that is emitted by an audio signal 211. The distance attenuation function 650 may be identical to the distance function 315 described in the context of FIG. 3*b*.

Different types of directivity control functions 600 and/or distance attenuation functions 650 may be considered, defined and applied for the directivity application control. Their shapes and values may be derived from physical considerations, measurement data and/or content creator's intent. The directivity control function 600 may be dependent on the specific listening situation for the listener 181. The listening situation may be described by one or more of the following parameters, i.e. the directivity control function 600 may be dependent on one or more of the following parameters,

- the frequency of the audio signal that is emitted by the audio source 211;
- the time at which that audio signal is rendered;
- the listener-to-object orientation, the listener-view direction and/or the trajectory of the listener 181;
- user interactions, other conditions and/or scene events; and/or
- system related conditions (e.g. rendering workload).

The schemes which are described in the present document allow the quality of 3D audio rendering to be improved, notably by avoiding a discontinuity in audio volume close to the origin 500 of an sound source 211. Furthermore, the complexity of directivity application may be reduced, notably by avoiding the application of object directivity where it is perceptually irrelevant. In addition, the possibility for controlling the directivity application via a configuration of the encoder 130 is provided.

In the present document, a generic approach for increasing 6DoF audio rendering quality, saving computational complexity and establishing directivity application control via a bitstream 140 (without modifying the directivity data itself) is described. Furthermore, a decoder interface is described, for enabling the decoder 150, 160 to perform directivity related processing as outlined in the present document. Furthermore, a bitstream syntax is described, for enabling the bitstream 140 to transport directivity control data. The directivity control data, notably the directivity control function 600, may be provided in a parametrized and sampled way and/or as a pre-defined function.

FIG. 7*a* shows a flow chart of an example method 700 for rendering an audio signal of an audio source 211, 212, 213 in a virtual reality rendering environment 180. The method 700 may be executed by a VR audio renderer 160.

The method 700 may comprise determining 701 whether or not a directivity pattern 232 of the audio source 211, 212, 213 is to be taken into account for a listening situation of a listener 181 within the virtual reality rendering environment 180. The listening situation may describe the context in which the listener 181 perceives the audio signal of the audio source 211, 212, 213. The context may depend on the distance between the audio source 211, 212, 213 and the listener 181. Alternatively, or in addition, the context may depend on whether the listener 181 faces the audio source 211, 212, 213 or whether the listener 181 turns his back on the audio source 211, 212, 213. Alternatively, or in addition, the context may depend on the listening position 182, 201, 202 of the listener 181 within the virtual reality rendering environment 180, notably within the audio scene 111 that is to be rendered.

In particular, the listening situation may be described by one or more parameters, wherein different listening situations may differ in at least one of the one or more parameters. Example parameters are,

- the listening position 182, 201, 202 of the listener 181 within the virtual reality rendering environment 180, notably within the audio scene 111;
- the distance 320 between the source position 500 (notably the center point) of the audio source 211, 212, 213 and the listening position 182, 201, 202 of the listener 181 within the virtual reality rendering environment 180, notably within the audio scene 111;
- the frequency and/or the spectral composition of the audio signal;
- the time instant, at which the audio signal is to be rendered;
- the orientation and/or the viewing direction and/or the movement trajectory of the listener 181 with regards to the audio source 211, 212, 213 within the virtual reality rendering environment 180 (i.e. within the virtual audio scene 111); by way of example, the listening situation may be different, depending on whether the listener 181 moves towards or away from the audio source 211, 212, 213;
- a condition, notably a condition with regards to (available) computational resources, of the renderer 160 for rendering the audio signal; and/or
- an action of the listener 181 with regards to the virtual reality rendering environment 180.

The method 700 may comprise determining 701 whether or not the directivity pattern 232 of the audio source 211, 212, 213 is to be taken into account based on the one or more parameters describing the listening situation. For this purpose, a (pre-determined) directivity control function 600 may be used, wherein the directivity control function 600 may be configured to indicate for different listening situations (notably for different combinations of the one or more parameters) whether or not the directivity pattern 232 of the audio source 211, 212, 213 is to be taken into account. In particular, the directivity control function 600 may be configured to identify listening situations, for which the directivity of the audio source 211, 212, 213 is not perceptually relevant and/or for which the directivity of the audio source 211, 212, 213 would lead to a perceptual artifact.

Furthermore, the method 700 comprises rendering 702 an audio signal of the audio source 211, 212, 213 without taking into account the directivity pattern 232 of the audio source 211, 212, 213, if it is determined that the directivity pattern 232 of the audio source 211, 212, 213 is not to be taken into account for the listening situation of the listener 181. As a result of this, the directivity pattern 232 may be ignored by the renderer 160. In particular, the renderer 160 may omit calculating the directivity gain 410 based on the directivity pattern 232. Furthermore, the renderer 160 may omit applying the directivity gain 410 to the audio signal for rendering the audio signal. As a result of this, a resource efficient rendering of the audio signal may be achieved, without impacting the perceptual quality.

On the other hand, the method 700 comprises rendering 703 the audio signal of the audio source 211, 212, 213 in dependence of the directivity pattern 232 of the audio source 211, 212, 213, if it is determined that the directivity pattern 232 is to be taken into account for the listening situation of the listener 181. In this case, the renderer 160 may determine the directivity gain 410 which is to be applied to the audio signal (based on the directivity angle 420 between the source position 500 of the audio source 211, 212, 213 and the listening position 182, 201, 202 of the listener 181). The directivity gain 410 may be applied to the audio signal prior to rendering the audio signal. As a result of this, the audio signal may be rendered at high perceptual quality (in a listening situation, for which directivity is relevant).

Hence, a method 700 is described, which verifies upfront, prior to processing an audio signal for rendering, (e.g. using a directivity control function 600) whether or not the use of directivity is relevant and/or perceptually advantageous in the current listening situation of the listener 181. The directivity is only calculated and applied, if it is determined that the use of directivity is relevant and/or perceptually advantageous. As a result of this, a resource efficient rendering of an audio signal at high perceptual quality is achieved.

The directivity pattern 232 of the audio source 211, 212, 213 may be indicative of the intensity of the audio signal in different directions. Alternatively, or in addition, the directivity pattern 232 may be indicative of a direction-dependent directivity gain 410 to be applied to the audio signal for rendering the audio signal (as outlined in the context of FIGS. 4*a* and 4*b*).

In particular, the directivity pattern 232 may be indicative of a directivity gain function 415. The directivity gain function 415 may indicate the directivity gain 410 as a function of the directivity angle 420 between the source position 500 of the audio source 211, 212, 213 and the listening position 182, 201, 202 of the listener 181. The directivity angle 420 may vary between 0° and 360° as the listening position 182, 201, 202 moves (on a circle) around the source position 500. In case of a non-uniform directivity pattern 232, the directivity gains 410 vary as a function of the directivity angle 420 (as shown e.g. in FIG. 4*b*).

Rendering 703 the audio signal of the audio source 211, 212, 213 in dependence of the directivity pattern 232 of the audio source 211, 212, 213 may comprises determining the directivity gain 410 (for rendering the audio signal in the particular listening situation) based on the directivity pattern 232 and based on the directivity angle 420 between the source position 500 of the audio source 211, 212, 213 and the listening position 182, 201, 202 of the listener 181 (as outlined in the context of FIGS. 4*a* and 4*b*). The audio signal may then be rendered in dependence of the directivity gain 410 (notably by applying the directivity gain 410 to the audio signal prior to rendering). As a result of this, high perceptual quality may be achieved within a virtual reality rendering environment 180 (as the listener 181 moves around within the rendering environment 180, thereby modifying the listening situation).

It should be noted that the method 700 described herein is typically repeated at a sequence of time instances (e.g. periodically with a certain repetition rate such as every 20 ms). At each time instant, the currently valid listening situation is determined (e.g. by determining current values for the one or more parameters for describing the listening situation). Furthermore, at each time instant, it is determined whether or not the directivity pattern 232 of the audio source 211, 212, 213 is to be taken into account. Furthermore, at each time instance, rendering of the audio signal is performed in dependence of the decision. As a result of this, a continuous rending of audio signals within a virtual reality rendering environment 180 may be achieved.

Furthermore, it should be noted that typically multiple audio signals from multiple different audio sources 211, 212, 213 are rendered simultaneously within the virtual reality rendering environment 180 (as outlined e.g. in the context of FIGS. 3*a* and 3*b*). The method 700 may be executed for each of the different audio signals and/or audio sources 211, 212, 213. A further parameter for describing the listening situation may be the number, the position, and/or the intensity of the different audio sources 211, 212, 213 which are active within the virtual reality rendering environment 180 (at a particular time instant).

The method 700 may comprise determining an attenuation or distance gain 310, 651 in dependence of the distance 320 between the source position 500 of the audio source 211, 212, 213 and the listening position 182, 201, 202 of the listener 181. The attenuation or distance gain 310, 651 may be determined using an attenuation or distance function 315, 650 which indicates the attenuation or distance gain 310, 651 as a function of the distance 320. The audio signal may be rendered in dependence of the attenuation or distance gain 310, 651 (as described in the context of FIGS. 3*a* and 3*b*), thereby further increasing the perceptual quality.

As indicated above, the distance 320 of the source position 500 of the audio source 211, 212, 213 from the listening position 182, 201, 202 of the listener 181 within the virtual reality rendering environment 180 may be determined (when determining the listening situation of the listener 181).

The method 700 may comprise determining 701 based on the determined distance 320 whether or not the directivity pattern 232 of the audio source 211, 212, 213 is to be taken into account. For this purpose, a pre-determined directivity control function 600 may be used, which is configured to indicate the relevance and/or the appropriateness of using directivity of the audio source 211, 212, 213 within the current listening situation, notably for the current distance 320 between the source position 500 and the listening position 182, 201, 202. The distance 320 between the source position 500 and the listening position 182, 201, 202 is a particularly important parameter of the listening situation, and by consequence, it has a particularly high impact on the resource efficiency and/or the perceptual quality when rendering the audio signal of the audio source 211, 212, 213.

It may be determined that the distance 320 of the source position 500 of the audio source 211, 212, 213 from the listening position 182, 201, 202 is smaller than a near field distance threshold. Based on this, it may be determined that the directivity pattern 232 of the audio source 211, 212, 213 is not to be taken into account. On the other hand, it may be determined that the distance 320 of the source position 500 of the audio source 211, 212, 213 from the listening position 182, 201, 202 is greater than the near field distance threshold. Based on this, it may be determined that the directivity pattern 232 of the audio source 211, 212, 213 is to be taken into account. The near field distance threshold may e.g. be 0.5 m or less. By suppressing the use of directivity at relatively small distances, perceptual artifacts may be prevented in cases where the listener 181 traverses the (virtual) audio source 211, 212, 213 within the virtual reality rendering environment 180.

Furthermore, it may be determined that the distance 320 of the source position 500 of the audio source 211, 212, 213 from the listening position 182, 201, 202 is greater than a far field distance threshold (which is larger than the near field distance threshold). Based on this, it may be determined that the directivity pattern 232 of the audio source 211, 212, 213 is not to be taken into account. On the other hand, it may be determined that the distance 320 of the source position 500 of the audio source 211, 212, 213 from the listening position 182, 201, 202 is smaller than the far field distance threshold. Based on this, it may be determined that the directivity pattern 232 of the audio source 211, 212, 213 is to be taken into account. The far field distance threshold may be 5 m or more. By suppressing the use of directivity at relatively large distances, the resource efficiency of the renderer 160 may be improved without impacting the perceptual quality.

The near field threshold and/or the far field threshold may depend on the directivity control function 600. The directivity control function 600 may be configured to provide a control value as a function of the distance 320 between the source position 500 and the listening position 182, 201, 202. The control value may be indicative of the extent to which the directivity pattern 232 is to be taken into account. In particular, the control value may indicate whether or not the directivity pattern 232 is to be taken into account (e.g. depending on whether the control value is greater or smaller than a control threshold D*). By making use of the directivity control function 600, the application of the directivity pattern 232 may be controlled in an efficient and reliable manner.

The method 700 may comprise determining a control value for the listening situation based on the directivity control function 600. The directivity control function 600 may be configured to provide different control values for different listening situations (notably for different distances 320 between the source position 500 and the listening position 182, 201, 202). It may then be determined in a reliable manner based on the control value whether or not the directivity pattern 232 of the audio source 211, 212, 213 is to be taken into account.

In particular, the method 700 may comprise comparing the control value with the control threshold D*. The directivity control function 600 may be configured to provide control values between a minimum value (e.g. 0) and a maximum value (e.g. 1). The control threshold may lie between the minimum value and the maximum value (e.g. at 0.5). It may then be determined in a reliable manner based on the comparison, in particular depending on whether the control value is greater or smaller than the control threshold, whether or not the directivity pattern 232 of the audio source 211, 212, 213 is to be taken into account. In particular, the method 700 may comprise determining that the directivity pattern 232 of the audio source 211, 212, 213 is not to be taken into account, if the control value for the listening situation is smaller than the control threshold. Alternatively, or in addition, the method 700 may comprise determining that the directivity pattern 232 of the audio source 211, 212, 213 is to be taken into account, if the control value for the listening situation is greater than the control threshold.

The directivity control function 600 may be configured to provide control values which are below the control threshold in a listening situation, for which the distance 320 of the source position 500 of the audio source 211, 212, 213 from the listening position 182, 201, 202 of the listener 181 is smaller than the near field threshold (thereby preventing perceptual artifacts when the user traverses the virtual audio source 211, 212, 213 within the virtual reality rendering environment 180). Alternatively, or in addition, the directivity control function 600 may be configured to provide control values which are below the control threshold in a listening situation, for which the distance 320 of the source position 500 of the audio source 211, 212, 213 from the listening position 182, 201, 202 of the listener 181 is greater than the far field threshold (thereby increasing resource efficiency of the renderer 160 without impacting the perceptual quality).

Hence, the method 700 may comprise determining a control value for the listening situation based on the directivity control function 600, wherein the directivity control function 600 may provide different control values for different listening situations of the listener 181 within the virtual reality rendering environment 180. As indicated above, the control value may be indicative of the extent to which the directivity pattern 232 is to be taken into account.

Furthermore, the method 700 may comprise adjusting the directivity pattern 232, notably a directivity gain 410 of the directivity pattern 232, of the audio source 211, 212, 213 in dependence of the control value (notably, if it is determined that the directivity pattern 232 is to be taken into account). The audio signal of the audio source 211, 212, 213 may then be rendered in dependence of the adjusted directivity pattern 232, notably in dependence of the adjusted directivity gain 410, of the audio source 211, 212, 213. Hence (in addition to deciding on whether or not to make use of the directivity pattern 232), the directivity control function 600 may be used to control the extent to which directivity is taken into account when rendering the audio signal. The extent may vary (in a continuous manner) in dependence of the listening situation of the listener 181 (notably in dependence of the distance 320 between the source position 500 and the listening position 182, 201, 202). By doing this, the perceptual quality of audio rendering within a virtual reality rendering environment 180 may be further improved.

Adjusting the directivity pattern 232 of the audio source 211, 212, 213 (in dependence of the control value) may comprise determining a weighted sum of the (non-uniform) directivity pattern 232 of the audio source 211, 212, 213 with a uniform directivity pattern, wherein a weight for determining the weighted sum may depend on the control value. The adjusted directivity pattern may be the weighted sum. In particular, the adjusted directivity gain may be determined as the weighted sum of the original directivity gain 410 and a uniform gain (typically 1 or 0 dB). By adjusting the directivity pattern 232 (smoothly) for distances 320 approaching the near field threshold or the far field threshold, smooth transitions may be achieved between the application and the suppression of the directivity pattern 232, thereby further increasing the perceptual quality.

The directivity pattern 232 of the audio source 211, 212, 213 may be applicable to a reference listening situation, notably to a reference distance 610 between the source position 500 of the audio source 211, 212, 213 and the listening position of the listener 181. In particular, the directivity pattern 232 may have been measured and/or designed for the reference listening situation, notably for the reference distance 610.

The directivity control function 600 may be such that the directivity pattern 232, notably the directivity gain 410, is not adjusted if the listening situation corresponds to the reference listening situation (notably if the distance 320 corresponds to the reference distance 610). By way of example, the directivity control function 600 may provide the maximum value for the control value (e.g. 1) if the listening situation corresponds to the reference listening situation.

Furthermore, the directivity control function 600 may be such that the extent of adjustment of the directivity pattern 232 increases with increasing deviation of the listening situation from the reference listening situation (notably within increasing deviation of the distance 320 from the reference distance 610). In particular, the directivity control function 600 may be such that the directivity pattern 232 progressively tends towards the uniform directivity pattern (i.e. the directivity gain 410 progressively tends towards 1 or 0 dB) with increasing deviation of the listening situation from the reference listening situation (notably within increasing deviation of the distance 320 from the reference distance 610). As a result of this, the perceptual quality may be increased further.

FIG. 7*b* shows a flow chart of an example method 710 for rendering an audio signal of a first audio source 211 to a listener 181 within a virtual reality rendering environment 180. The method 710 may be executed by a renderer 160. It should be noted that all aspects which have been described in the present document, notably in the context of method 700, are also applicable to the method 710 (standalone or in combination).

The method 710 comprises determining 711 a control value for the listening situation of the listener 181 within the virtual reality rendering environment 180 based on the directivity control function 600. As indicated above, the directivity control function 600 may provide different control values for different listening situations, wherein the control value may be indicative of the extent to which the directivity of an audio source 211, 212, 213 is to be taken into account.

The method 710 further comprises adjusting 712 the directivity pattern 232, notably the directivity gain 410, of the first audio source 211, 212, 213 in dependence of the control value. In addition, the method 710 comprises rendering 713 the audio signal of the first audio source 211, 212, 213 in dependence of the adjusted directivity pattern 232, notably in dependence of the directivity gain 410, of the first audio source 211, 212, 213 to the listener 181 within the virtual reality rendering environment 180. By adjusting the extent of the application of directivity in dependence of the current listening situation, the perceptual quality of audio rendering within a virtual reality rendering environment 180 may be increased.

As outlined in the context of FIG. 1*a*, the data for rending audio signals within a virtual reality rendering environment may be provided by an encoder 130 within a bitstream 140. FIG. 7*c* shows a flow chart of an example method 720 for generating a bitstream 140. The method 720 may be executed by an encoder 130. It should be noted that the features described in the document may be applied to method 720 (standalone and/or in combination).

The method 720 comprises determining 721 an audio signal of at least one audio source 211, 212, 213, determining 722 a source position 500 of the at least one audio source 211, 212, 213 within a virtual reality rendering environment 180, and/or determining 723 a directivity pattern 232 of the at least one audio source 211, 212, 213. Furthermore, the method 720 comprises determining 724 a directivity control function 600 for controlling the use of the directivity pattern 232 for rendering the audio signal of the at least one audio source 211, 212, 213 in dependence of the listening situation of a listener 181 within the virtual reality rendering environment 180. In addition, the method 720 comprises inserting 725 data regarding the audio signal, the source position 500, the directivity pattern 232 and/or the directivity control function 600 into the bitstream 140.

Hence, a creator of a virtual reality environment is provided with means for controlling the directivity of one or more audio sources 211, 212, 213 in a flexible and precise manner.

Furthermore, a virtual reality audio renderer 160 for rendering an audio signal of an audio source 211, 212, 213 in a virtual reality rendering environment 180 is described. The audio renderer 160 may be configured to execute the method steps of method 700 and/or method 710.

In addition, an audio encoder 130 configured to generate a bitstream 140 is described. The audio encoder 130 may be configured to execute the method steps of method 720.

Furthermore, a bitstream 140 is described. The bitstream 140 may be indicative of the audio signal of at least one audio source 211, 212, 213, and/or of the source position 500 of the at least one audio source 211, 212, 213 within a virtual reality rendering environment 180 (i.e. within an audio scene 111). Furthermore, the bitstream 140 may be indicative of the directivity pattern 232 of the at least one audio source 211, 212, 213, and/or of the directivity control function 600 for controlling use of the directivity pattern 232 for rendering the audio signal of the at least one audio source 211, 212, 213 in dependence of a listening situation of a listener 181 within the virtual reality rendering environment 180.

The directivity control function 600 may be indicated in a parametrized and/or in a sampled manner. The directivity pattern 232 and/or the directivity control function 600 may be provided as VR metadata within the bitstream 140 (as outlined in the context of FIG. 1*a*).

The methods and systems described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the Internet. Typical devices making use of the methods and systems described in the present document are portable electronic devices or other consumer equipment which are used to store and/or render audio signals.

Various aspects of the present invention may be appreciated from the following enumerated example embodiments (EEEs):

1) A method (700) for rendering an audio signal of an audio source (211, 212, 213) in a virtual reality rendering environment (180), the method (700) comprising,
   - determining (701) whether or not a directivity pattern (232) of the audio source (211, 212, 213) is to be taken into account for a listening situation of a listener (181) within the virtual reality rendering environment (180);
   - rendering (702) an audio signal of the audio source (211, 212, 213) without taking into account the directivity pattern (232) of the audio source (211, 212, 213), if it is determined that the directivity pattern (232) of the audio source (211, 212, 213) is not to be taken into account for the listening situation of the listener (181); and
   - rendering (703) the audio signal of the audio source (211, 212, 213) in dependence of the directivity pattern (232) of the audio source (211, 212, 213), if it is determined that the directivity pattern (232) is to be taken into account for the listening situation of the listener (181).

2) The method (700) of EEE 1, wherein the method (700) comprises,
   - determining one or more parameters describing the listening situation; and
   - determining (701) whether or not the directivity pattern (232) of the audio source (211, 212, 213) is to be taken into account based on the one or more parameters.

3) The method (700) of EEE 2, wherein the one or more parameters comprise
   - a distance (320) between a source position (500) of the audio source (211, 212, 213) and a listening position (182, 201, 202) of the listener (181);
   - a frequency of the audio signal;
   - a time instant, at which the audio signal is to be rendered;
   - an orientation and/or a viewing direction and/or a trajectory of the listener (181) with regards to the audio source (211, 212, 213) within the virtual reality rendering environment (180);
   - a condition, notably a condition with regards to computational resources, of a renderer (160) for rendering the audio signal; and/or
   - an action of the listener (181) with regards to the virtual reality rendering environment (180).

4) The method (700) of any previous EEE, wherein the method (700) comprises,
   - determining a distance (320) of a source position (500) of the audio source (211, 212, 213) from a listening position (182, 201, 202) of the listener (181) within the virtual reality rendering environment (180); and
   - determining (701) based on the distance (320) whether or not the directivity pattern (232) of the audio source (211, 212, 213) is to be taken into account.

5) The method (700) of EEE 4, wherein the method (700) comprises,
   - determining that the distance (320) of the source position (500) of the audio source (211, 212, 213) from the listening position (182, 201, 202) is smaller than a near field distance threshold; and
   - in reaction to this, determining that the directivity pattern (232) of the audio source (211, 212, 213) is not to be taken into account; and/or
   - determining that the distance (320) of the source position (500) of the audio source (211, 212, 213) from the listening position (182, 201, 202) is greater than the near field distance threshold; and
   - in reaction to this, determining that the directivity pattern (232) of the audio source (211, 212, 213) is to be taken into account.

6) The method (700) of any of EEE 4 to 5, wherein the method (700) comprises,
   - determining that the distance (320) of the source position (500) of the audio source (211, 212, 213) from the listening position (182, 201, 202) is greater than a far field distance threshold; and
   - in reaction to this, determining that the directivity pattern (232) of the audio source (211, 212, 213) is not to be taken into account; and/or
   - determining that the distance (320) of the source position (500) of the audio source (211, 212, 213) from the listening position (182, 201, 202) is smaller than the far field distance threshold; and in reaction to this, determining that the directivity pattern (232) of the audio source (211, 212, 213) is to be taken into account.

7) The method (700) of any of EEE 5 to 6, wherein the near field threshold and/or the far field threshold depend on a directivity control function (600);

the directivity control function (600) provides a control value as a function of the distance (320); and the control value is indicative of an extent to which the directivity pattern (232) is to be taken into account.

8) The method (700) of any previous EEE, wherein the method (700) comprises, determining a control value for the listening situation based on a directivity control function (600); wherein the directivity control function (600) provides different control values for different listening situations; and determining based on the control value whether or not the directivity pattern (232) of the audio source (211, 212, 213) is to be taken into account.

9) The method (700) of EEE 8, wherein the method (700) comprises, comparing the control value with a control threshold; and determining based on the comparison, in particular depending on whether the control value is greater or smaller than the control threshold, whether or not the directivity pattern (232) of the audio source (211, 212, 213) is to be taken into account.

10) The method (700) of EEE 9, wherein the directivity control function (600) is configured to provide control values between a minimum value and a maximum value;

in particular, the minimum value is 0 and/or the maximum value is 1;

the control threshold lies between the minimum value and the maximum value; and the method (700) comprises determining that the directivity pattern (232) of the audio source (211, 212, 213) is not to be taken into account, if the control value for the listening situation is smaller than the control threshold; and/or determining that the directivity pattern (232) of the audio source (211, 212, 213) is to be taken into account, if the control value for the listening situation is greater than the control threshold.

11) The method (700) of EEE 10, wherein the directivity control function (600) is configured to provide control values which are below the control threshold in a listening situation, for which a distance (320) of a source position (500) of the audio source (211, 212, 213) from a listening position (182, 201, 202) of the listener (181) is smaller than a near field threshold; and/or the distance (320) of the source position (500) of the audio source (211, 212, 213) from the listening position (182, 201, 202) of the listener (181) is greater than a far field threshold.

12) The method (700) of any of the previous EEE, wherein the method (700) comprises, determining a control value for the listening situation based on a directivity control function (600); wherein the directivity control function (600) provides different control values for different listening situations; wherein the control value is indicative of an extent to which the directivity pattern (232) is to be taken into account;

adjusting the directivity pattern (232) of the audio source (211, 212, 213) in dependence of the control value; and rendering (703) the audio signal of the audio source (211, 212, 213) in dependence of the adjusted directivity pattern (232) of the audio source (211, 212, 213).

13) The method (700) of EEE 12, wherein adjusting the directivity pattern (232) of the audio source (211, 212, 213) comprises determining a weighted sum of the directivity pattern (232) of the audio source (211, 212, 213) with a uniform directivity pattern; and a weight for determining the weighted sum depends on the control value.

14) The method (700) of any of EEE 12 to 13, wherein the directivity pattern (232) of the audio source (211, 212, 213) is applicable to a reference listening situation, notably to a reference distance (610) between a source position (500) of the audio source (211, 212, 213) and a listening position of the listener (181); and the directivity control function (600) is such that the directivity pattern (232) is not adjusted if the listening situation corresponds to the reference listening situation; and/or an extent of adjustment of the directivity pattern (232) increases with increasing deviation of the listening situation from the reference listening situation, in particular such that the directivity pattern (232) progressively tends towards a uniform directivity pattern with increasing deviation of the listening situation from the reference listening situation.

15) The method (700) of any previous EEE, wherein the directivity pattern (232) of the audio source (211, 212, 213) is indicative of an intensity of the audio signal in different directions; and/or the directivity pattern (232) is indicative of a direction-dependent directivity gain (410) to be applied to the audio signal for rendering the audio signal.

16) The method (700) of EEE 14, wherein the directivity pattern (232) is indicative of a directivity gain function (415); and the directivity gain function (415) indicates a directivity gain (410) as a function of a directivity angle (420) between a source position (500) of the audio source (211, 212, 213) and a listening position (182, 201, 202) of the listener (181).

17) The method (700) of any previous EEE, wherein rendering (703) the audio signal of the audio source (211, 212, 213) in dependence of the directivity pattern (232) of the audio source (211, 212, 213) comprises, determining a directivity gain (410) based on the directivity pattern (232) and based on a directivity angle (420) between a source position (500) of the audio source (211, 212, 213) and a listening position (182, 201, 202) of the listener (181); and rending the audio signal in dependence of the directivity gain (410).

18) The method (700) of any previous EEE, wherein the method (700) comprises, determining an attenuation gain (651) in dependence of a distance (320) between a source position (500) of the audio source (211, 212, 213) and a listening position (182, 201, 202) of the listener (181), using an attenuation function (650) which indicates the attenuation gain (651) as a function of the distance (320); and rending the audio signal in dependence of the attenuation gain (651).

19) A method (710) for rendering an audio signal of a first audio source (211) to a listener (181) within a virtual reality rendering environment (180), the method (710) comprising, determining (711) a control value for a listening situation of the listener (181) within the virtual reality rendering environment (180) based on a directivity control function (600); wherein the directivity control function (600) provides different control values for different listening situations; wherein the control value is indicative of an extent to which a directivity of an audio source (211, 212, 213) is to be taken into account;

adjusting (712) a directivity pattern (232) of the first audio source (211, 212, 213) in dependence of the control value; and rendering (713) the audio signal of the first audio source (211, 212, 213) in dependence of the adjusted directivity pattern (232) of the first audio source (211, 212, 213) to the listener (181) within the virtual reality rendering environment (180).

20) A virtual reality audio renderer (160) for rendering an audio signal of an audio source (211, 212, 213) in a virtual reality rendering environment (180), wherein the audio renderer (160) is configured to determine whether or not a directivity pattern (232) of the audio source (211, 212, 213) is to be taken into account for a listening situation of a listener (181) within the virtual reality rendering environment (180);

render an audio signal of the audio source (211, 212, 213) without taking into account the directivity pattern (232) of the audio source (211, 212, 213), if it is determined that the directivity pattern (232) of the audio source (211, 212, 213) is not to be taken into account for the listening situation of the listener (181); and render the audio signal of the audio source (211, 212, 213) in dependence of the directivity pattern (232) of the audio source (211, 212, 213), if it is determined that the directivity pattern (232) is to be taken into account for the listening situation of the listener (181).

21) A virtual reality audio renderer (160) for rendering an audio signal of a first audio source (211) to a listener (181) within a virtual reality rendering environment (180), wherein the audio renderer (160) is configured to determine a control value for a listening situation of the listener (181) within the virtual reality rendering environment (180) based on a directivity control function (600); wherein the directivity control function (600) provides different control values for different listening situations; wherein the control value is indicative of an extent to which a directivity of an audio source (211, 212, 213) is to be taken into account;

adjust a directivity pattern (232) of the first audio source (211, 212, 213) in dependence of the control value; and render the audio signal of the first audio source (211, 212, 213) in dependence of the adjusted directivity pattern (232) of the first audio source (211, 212, 213) to the listener (181) within the virtual reality rendering environment (180).

22) An audio encoder (130) configured to generate a bitstream (140) which is indicative of an audio signal of at least one audio source (211, 212, 213);

a source position (500) of the at least one audio source (211, 212, 213) within a virtual reality rendering environment (180);

a directivity pattern (232) of the at least one audio source (211, 212, 213); and a directivity control function (600) for controlling use of the directivity pattern (232) for rendering the audio signal of the at least one audio source (211, 212, 213) in dependence of a listening situation of a listener (181) within the virtual reality rendering environment (180).

23) A bitstream (140) which is indicative of an audio signal of at least one audio source (211, 212, 213);

a source position (500) of the at least one audio source (211, 212, 213) within a virtual reality rendering environment (180);

a directivity pattern (232) of the at least one audio source (211, 212, 213); and a directivity control function (600) for controlling use of the directivity pattern (232) for rendering the audio signal of the at least one audio source (211, 212, 213) in dependence of a listening situation of a listener (181) within the virtual reality rendering environment (180).

24) A method (720) for generating a bitstream (140), the method (720) comprising, determining (721) an audio signal of at least one audio source (211, 212, 213);

determining (722) a source position (500) of the at least one audio source (211, 212, 213) within a virtual reality rendering environment (180);

determining (723) a directivity pattern (232) of the at least one audio source (211, 212, 213);

determining (724) a directivity control function (600) for controlling use of the directivity pattern (232) for rendering the audio signal of the at least one audio source (211, 212, 213) in dependence of a listening situation of a listener (181) within the virtual reality rendering environment (180); and inserting (725) data regarding the audio signal, the source position (500), the directivity pattern (232) and the directivity control function (600) into the bitstream (140).

The invention claimed is:

1. A method for rendering an audio signal of an audio source in a virtual reality rendering environment, the method comprising:

determining a distance of a source position of the audio source from a listening position of a listener within the virtual reality rendering environment;

determining based on the distance whether or not a directivity pattern of the audio source is to be taken into account for a listening situation of the listener within the virtual reality rendering environment;

rendering an audio signal of the audio source without taking into account the directivity pattern of the audio source, if it is determined that the directivity pattern of the audio source is not to be taken into account for the listening situation of the listener; and rendering the audio signal of the audio source in dependence of the directivity pattern of the audio source, if it is determined that the directivity pattern is to be taken into account for the listening situation of the listener.

2. The method of claim 1, wherein the method comprises:

determining one or more parameters describing the listening situation; and determining whether or not the directivity pattern of the audio source is to be taken into account based on the one or more parameters.

3. The method of claim 2, wherein the one or more parameters comprise:

the distance between the source position of the audio source and the listening position of the listener;

a frequency of the audio signal;

a time instant, at which the audio signal is to be rendered;

an orientation and/or a viewing direction and/or a trajectory of the listener with regards to the audio source within the virtual reality rendering environment;

a condition, notably a condition with regards to computational resources, of a renderer for rendering the audio signal; and/or an action of the listener with regards to the virtual reality rendering environment.

4. The method claim 1, wherein the method comprises:

determining that the distance of the source position of the audio source from the listening position is smaller than a near field distance threshold; and determining that the directivity pattern of the audio source is not to be taken into account; and/or determining that the distance of the source position of the audio source from the listening position is greater than the near field distance threshold; and determining that the directivity pattern of the audio source is to be taken into account.

5. The method claim 1, wherein the method comprises:

determining that the distance of the source position of the audio source from the listening position greater than a far field distance threshold; and determining that the directivity pattern of the audio source is not to be taken into account; and/or determining that the distance of the source position of the audio source from the listening position is smaller than the far field distance threshold; and determining that the directivity pattern of the audio source is to be taken into account.

6. The method of claim 1, wherein the near field threshold and/or the far field threshold depend on a directivity control function;

the directivity control function provides a control value as a function of the distance; and the control value is indicative of an extent to which the directivity pattern is to be taken into account.

7. The method claim 1, wherein the method comprises:

determining a control value for the listening situation based on a directivity control function; wherein the directivity control function provides different control values for different listening situations; and determining based on the control value whether or not the directivity pattern of the audio source is to be taken into account.

8. The method of claim 7, wherein the method comprises:

comparing the control value with a control threshold; and determining based on the comparison, in particular depending on whether the control value is greater or smaller than the control threshold, whether or not the directivity pattern of the audio source is to be taken into account.

9. The method of claim 8, wherein the directivity control function is configured to provide control values between a minimum value and a maximum value, wherein, the minimum value is 0 and/or the maximum value is 1;

the control threshold lies between the minimum value and the maximum value; and wherein the method comprises:

determining that the directivity pattern of the audio source is not to be taken into account, if the control value for the listening situation is smaller than the control threshold; and/or determining that the directivity pattern of the audio source is to be taken into account, if the control value for the listening situation is greater than the control threshold.

10. The method of claim 9, wherein the directivity control function is configured to provide control values which are below the control threshold in a listening situation, for which the distance of the source position of the audio source from the listening position of the listener is smaller than a near field threshold; and/or the distance of the source position of the audio source from the listening position of the listener is greater than a far field threshold.

11. The method of claim 1, wherein the method comprises:

determining a control value for the listening situation based on a directivity control function; wherein the directivity control function provides different control values for different listening situations; wherein the control value is indicative of an extent to which the directivity pattern is to be taken into account;

adjusting the directivity pattern of the audio source in dependence of the control value; and rendering the audio signal of the audio source in dependence of the adjusted directivity pattern of the audio source.

12. The method of claim 11, wherein adjusting the directivity pattern of the audio source comprises determining a weighted sum of the directivity pattern of the audio source with a uniform directivity pattern; and a weight for determining the weighted sum depends on the control value.

13. The method of claim 11, wherein the directivity pattern of the audio source is applicable to a reference listening situation, notably to a reference distance between the source position of the audio source and the listening position of the listener; and the directivity control function is such that the directivity pattern is not adjusted if the listening situation corresponds to the reference listening situation; and/or an extent of adjustment of the directivity pattern increases with increasing deviation of the listening situation from the reference listening situation, in particular such that the directivity pattern progressively tends towards a uniform directivity pattern with increasing deviation of the listening situation from the reference listening situation.

14. A method for rendering an audio signal of a first audio source to a listener within a virtual reality rendering environment, the method comprising, determining a control value for a listening situation of the listener within the virtual reality rendering environment based on a directivity control function; wherein the directivity control function provides different control values for different listening situations; wherein the control value is a function of a distance between a position of the first audio source and a listening position of the listener and wherein the control value is indicative of an extent to which a directivity of an audio source is to be taken into account;

adjusting a directivity pattern of the first audio source in dependence of the control value; and rendering the audio signal of the first audio source in dependence of the adjusted directivity pattern of the first audio source to the listener within the virtual reality rendering environment.

15. A virtual reality audio renderer for rendering an audio signal of an audio source in a virtual reality rendering environment, wherein the audio renderer is configured to determine a distance of a source position of the audio source from a listening position of a listener within the virtual reality rendering environment;

determine based on the distance whether or not a directivity pattern of the audio source is to be taken into account for a listening situation of the listener within the virtual reality rendering environment;

render an audio signal of the audio source without taking into account the directivity pattern of the audio source, if it is determined that the directivity pattern of the audio source is not to be taken into account for the listening situation of the listener; and render the audio signal of the audio source in dependence of the directivity pattern of the audio source, if it is determined that the directivity pattern is to be taken into account for the listening situation of the listener.

16. A virtual reality audio renderer for rendering an audio signal of a first audio source to a listener within a virtual reality rendering environment, wherein the audio renderer is configured to determine a control value for a listening situation of the listener within the virtual reality rendering environment based on a directivity control function; wherein the directivity control function provides different control values for different listening situations; wherein the control value is a function of a distance between a listening position of the first audio source and a position of the listener and wherein the control value is indicative of an extent to which a directivity of an audio source is to be taken into account;

adjust a directivity pattern of the first audio source in dependence of the control value; and render the audio signal of the first audio source in dependence of the adjusted directivity pattern of the first audio source to the listener within the virtual reality rendering environment.

* * * * *